United States Patent

[11] 3,543,668

[72] Inventor Mark Vlock
 25 Tinker St., Woodstock, New York 12498
[21] Appl. No. 667,132
[22] Filed Sept. 12, 1967
[45] Patented Dec. 1, 1970

[54] FILM DEVELOPING MAGAZINE
 4 Claims, 3 Drawing Figs.
[52] U.S. Cl. .................................................. 95/100;
 118/500; 206/62; 211/41
[51] Int. Cl. ............................................... G03d 3/00
[50] Field of Search .......................................... 95/100, 98;
 118/500, 501, 503, (Inquired); 211/40, 41,
 (Inquired); 206/62, 73, (Inquired); 40/(Inquired)

[56] References Cited
 UNITED STATES PATENTS
| 2,082,876 | 6/1937 | Davis | 95/100 |
|---|---|---|---|
| 2,431,535 | 11/1947 | Bergstrom | 206/62X |
| 2,533,101 | 12/1950 | Ghrist | 95/100 |

FOREIGN PATENTS
| 138,054 | 7/1950 | Australia | 95/100 |
|---|---|---|---|
| 878,750 | 10/1942 | France | 95/100 |
| 413,521 | 5/1925 | Germany | 95/100 |

Primary Examiner—Norton Ansher
Assistant Examiner—Fred L. Braun
Attorney—F. J. Pisarra ABSTRACT: A film developing magazine having an elongated hollow body of polygonic cross section in which certain opposed wall portions contain transverse slots that collectively define a plurality of spaced parallel film-receiving slots for receiving and centering individual film units which are inserted through the top of the body. The magazine is provided with a releasable locking device for preventing upward displacement of the inserted films during handling of the filled magazine. In one embodiment, the magazine has a pair of converging lower wall portions connected at their lower edges to the bottom wall of the magazine, and a pair of diverging upper wall portions which are connected at their lower edges to the upper edges of the lower wall portions. In another embodiment, the lower wall portions diverge from the bottom wall of the magazine and are connected at their upper edges to the lower edges of a pair of converging upper wall portions.

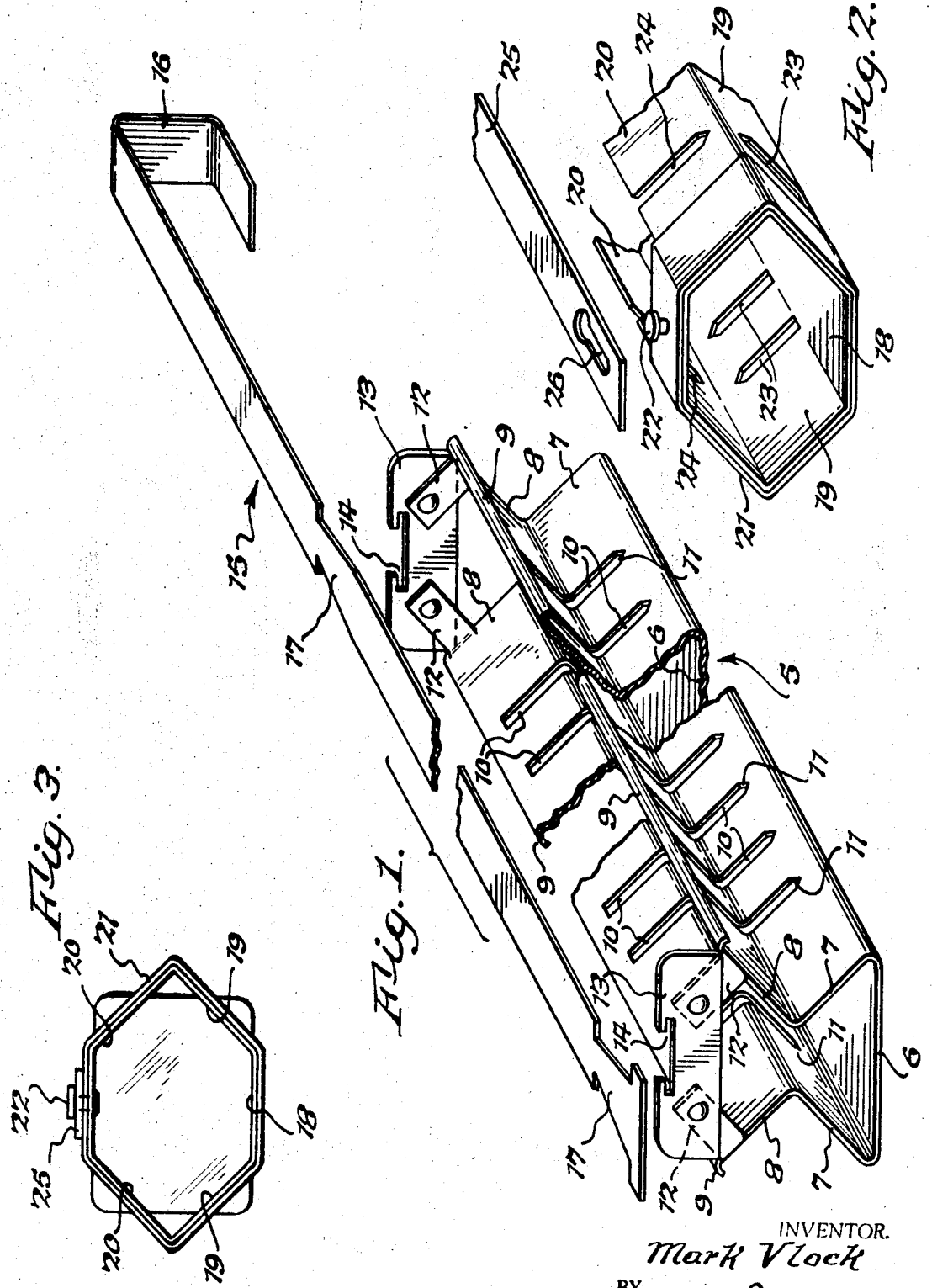

FILM DEVELOPING MAGAZINE

THE INVENTION

This invention relates generally to new and useful improvements in photographic film developing accessories and particularly seeks to provide a novel rack or magazine for holding and retaining a plurality of spaced exposed X-ray or other films as an incident to the development thereof.

Heretofore most X-ray films have been developed through the use of hangars having a solid longitudinal centerpiece provided with a plurality of spaced pairs of oppositely extending arms each of which is provided with a spring clip at its outer end.

There are several objectionable features to those hangars such as frequent loss and/or overexposure of film as the accidental result of dropping out of the spring clips when immersed in the developing tank; marring of the film in the areas contacted by the clips; and the awkwardness of loading since two hands must be used and after a number of films have been clipped in place it is difficult to avoid the accidental displacement of one or more of them as additional films are being clipped in place.

The film developing magazines or racks constructed in accordance with this invention overcome all of the above-noted objections.

Therefore, an object of this invention is to provide a novel magazine or rack for holding and retaining a plurality of exposed X-ray or other films in spaced parallel relation as an incident to the development thereof.

Another object of this invention is to provide a film holding magazine of the character stated that is fabricated from a material inert to photo chemicals and formed as an open ended thin-walled sleeve or trough of polygonic cross section.

Another object of this invention is to provide a magazine of the character stated in which opposed pairs of adjacent walls are transversely slotted to define collectively a plurality of spaced parallel film receiving and retaining slots.

Another object of this invention is to provide a magazine of the character stated in which the inner end of each slot terminates in a vee that is engageable with an edge portion of the inserted film to center the film between and out of contact with the walls of the slot.

Another object of this invention is to provide a magazine of the character stated that includes a quick-release combined film locking strap and manipulating handle or suspension hook.

A further object of this invention is to provide a magazine of the character stated that is simple in design, rugged in construction and economical to manufacture.

With these and other objects, the nature of which will be apparent, the invention will be more fully understood by reference to the drawing, the accompanying detailed description and the appended claims.

In the drawing:

FIG. 1 is an exploded perspective, partly broken, of one form of film developing magazine constructed in accordance with this invention and shows the locking strap in position for attachment thereto;

FIG. 2 is a fragmentary exploded perspective of a modification of the film magazine; and FIG. 3 is an end elevation of the modification of FIG. 2, but showing the locking strap in place after the magazine has been filled with film.

Referring to the drawing in detail, the invention as illustrated is embodied in a film developing magazine having a body generally indicated 5 formed from stainless steel or any other metal or selfsupporting plastic material that is inert to the chemicals normally used in developing and fixing exposed films. The body 5 is in the form of an open end, open top channel or trough having an X-like cross section and includes a flat bottom 6, a pair of inwardly inclined or converging lower sidewall portions 7,7 terminating at their upper edges in a pair of outwardly inclined or diverging upper sidewall portions 8,8 which are stiffened at their free ends by being bent back to form ribs 9,9.

Opposed pairs of transversely disposed spaced parallel slots 10,10 are cut or otherwise formed in the wall portions 7 and 8, and each slot 10 terminates at its inner end in a vee 11. The widths of the slots 10 are substantially greater than the thickness of the undeveloped films to be supported therein so that the vees 11 will serve to center the films between the walls of the slots and out of contact therewith.

The ends of the upper wall portions 8 are provided with inwardly directed ears or lugs 12, each pair of which is rigidly connected to a transverse plate 13 provided along its upper edge with a key slot 14 intermediate the ends thereof.

A combined film locking strap and suspension handle generally indicated 15 is configured to be engaged within the slots 14 and is provided at one end with a hangar or handle extension 16. The ends of the strap 15 are trapezoidally shaped as at 17,17 for reception into the slots 14 and for subsequent locking engagement therewith when the strap is moved longitudinally in one direction and released when it is moved in the opposite direction.

It will be understood that, preferably, the width spanned by each set of opposed slots 10 is equal to the longer dimension of a film to be supported therein and the height spanned by alined slots on each side is equal to the shorter dimension of the supported film, although reverse proportions may be used if desired.

Also, if desired to provide for quicker or more complete circulation of developing fluid around and through the loaded magazine, the flat bottom 6 may be suitably perforated or apertured.

In use the magazine may be quickly loaded by one hand simply by inserting individual films in each transverse slot and then securing the strap 15 over the open top of the magazine into locking engagement with the slots 14. When the hangar handle 16 is engaged over the supporting unit of a developing tank the weight of the loaded magazine will keep the magazine securely locked to the strap 15 and no accidental displacement of the films can occur.

The same inventive concept is illustrated in the modification shown in FIGS. 2 and 3 of the drawing in which a film developing magazine may be formed from a suitably selected sheet or extruded plastic into an open end, open top channel or trough of generally hexagonal cross section that includes a flat bottom 18, diverging lower sidewalls 19,19 and converging upper sidewalls 20,20. An externally affixed stiffening and reinforcing collar 21 is provided at each end of the trough and has a strap-engaging stud 22 affixed to its upper panel that spans the open top of the trough.

In this modification a plurality of vee-ended slots 23 and 24, respectively, extend upwardly from the bottom edges of the lower sidewalls 19 and downwardly from the top edges of the upper sidewalls 20 to define collectively a plurality of film receiving and retaining slots arranged in spaced parallel relationship.

A locking strap 25, similar to the strap 15 of the unit shown in FIG. 1, is provided at each end with a keyhole slot 26 adapted to be brought into locking engagement with the studs 22, and is provided at one end with a suspension hangar (not shown) similar to the hangar extension 16 of the strap 15.

An end elevation of the filled and locked magazine is shown in FIG. 3 of the drawing and it will be clearly seen that it is only the edges of the film 27 that are contacted by elements of the magazines, leaving both faces of each film completely exposed for uniform contact by photochemicals.

Although the illustrated embodiments of the invention show magazines constructed as open top troughs or channels, they could be of closed top construction. In the latter event it would be necessary to transversely slot the top closure panel by slots vertically alined with the slots in the walls in order to permit insertion of the films into the holding and retaining slots collectively defined by the wall slots. The locking straps would still be employed to prevent the films from becoming displaced from the magazine.

It is of course to be understood that variations in arrangements and proportions of parts may be made within the scope of the appended claims.

I claim:

1. A magazine for holding and retaining individual units of exposed film as an incident to the development thereof comprising an elongated hollow body of X-like cross section including a flat bottom wall, a pair of converging lower wall portions connected thereto along their lower edges, and a pair of diverging upper wall portions connected along their lower edges to the upper edges of said lower wall portions, each pair of said lower and upper wall portions being provided with a plurality of spaced parallel slots extending laterally from the line of intersection between each pair of walls to a vertical plane lying within that containing the outer edges thereof with the slots in each pair transversely alined with those in the other pair, means releasably connected to said body for preventing upward displacement of any film units that have been inserted therein, and a retaining plate rigidly affixed across the ends of said upper wall portions adjacent each end of said body and provided with means for releasable connection with said film displacement preventing means.

2. A magazine for holding and retaining individual units of exposed film as an incident to the development thereof comprising an elongated hollow body of hexagonal cross section including a flat bottom wall, a pair of diverging lower wall portions connected thereto along their lower edges, and a pair of converging upper wall portions connected along their lower edges to the upper edges of said lower wall portions, each wall of each pair of said lower and upper wall portions being provided with a plurality of spaced parallel slots extending laterally from a vertical plane containing the line of juncture between said bottom wall and said lower wall portions to a vertical plane lying within that containing the line of junction between said lower and upper wall portions with the slots in each pair of connected lower and upper wall portions transversely alined with those in the other pair, and means releasably connected to said body for preventing upward displacement of any film units that have been inserted therein.

3. The magazine of claim 2 in which the lateral distance spanned by said film-receiving slots is substantially equal to one cross-sectional dimension of a film unit, the vertical distance spanned by said film-receiving slots is approximately equal to the other cross-sectional dimension of said film unit, and the gap between the walls of said slots is substantially greater than the thickness of any film unit to be inserted therein.

4. The magazine of claim 3 in which certain of the slots that collectively define film-receiving slots are provided with vee-shaped closed ends adapted to engage edge portions of the inserted film units whereby to center said film units between the walls of said slots.